Figure 1:
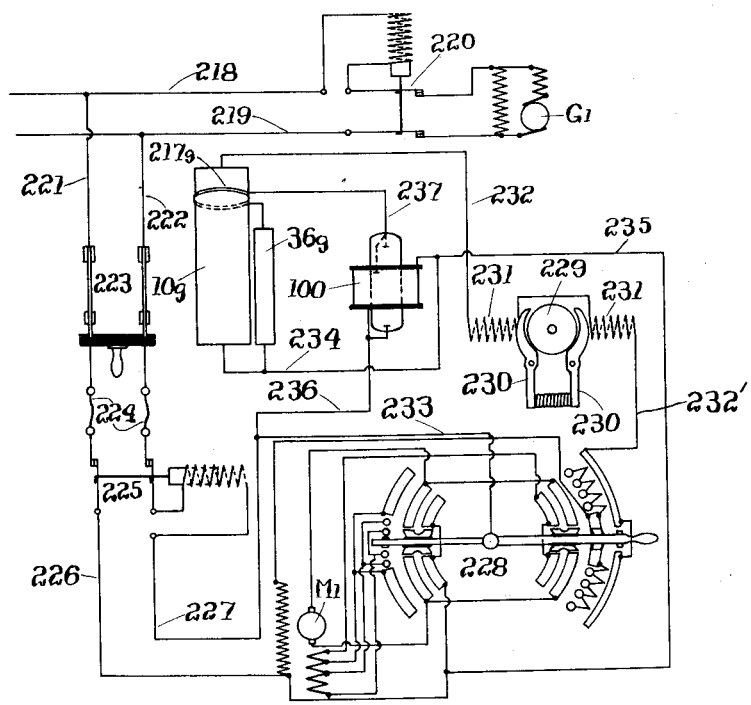

Aug. 15, 1933.   L. E. KING   1,922,163
ELECTRIC PROTECTIVE SYSTEM FOR ELEVATORS AND THE LIKE
Original Filed July 23, 1923   2 Sheets-Sheet 1

Inventor
Lloyd E. King
By Albert C. Bell
Attorney

Aug. 15, 1933.  L. E. KING  1,922,163
ELECTRIC PROTECTIVE SYSTEM FOR ELEVATORS AND THE LIKE
Original Filed July 23, 1923    2 Sheets-Sheet 2
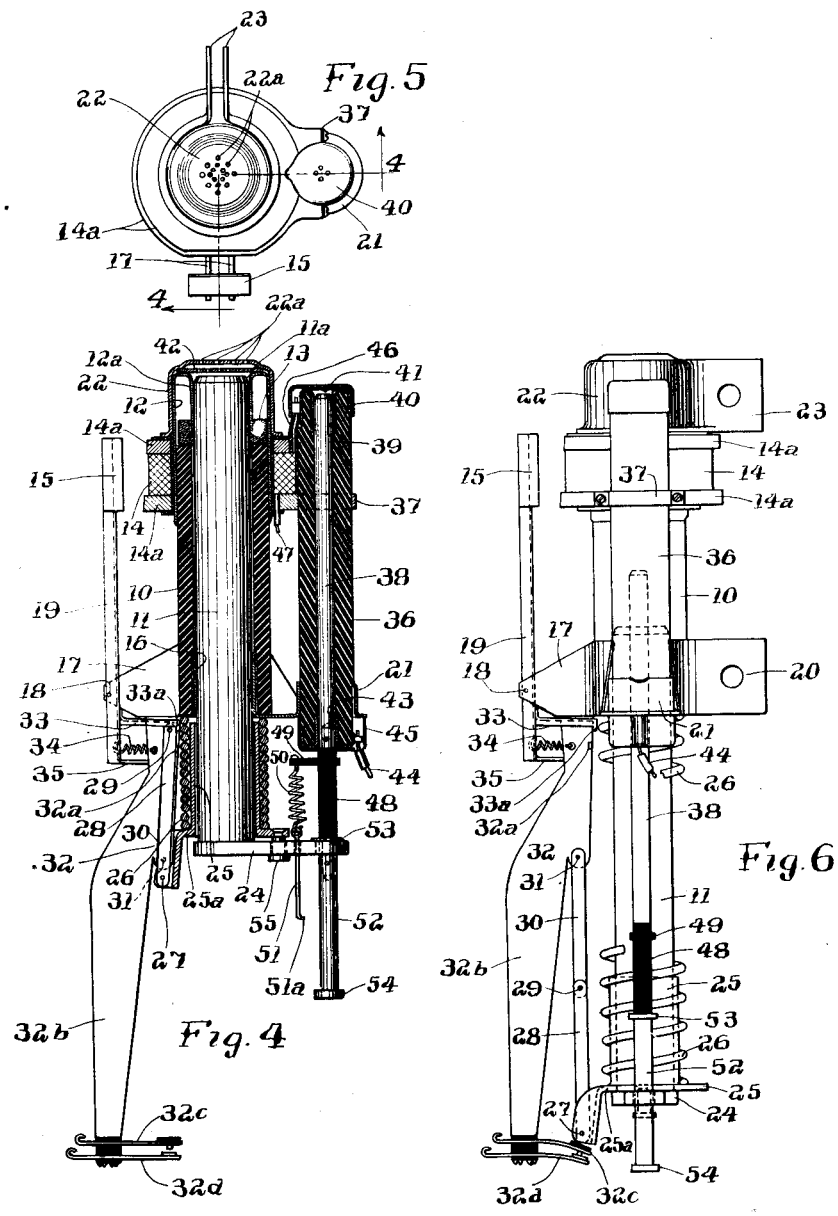
Inventor
Lloyd E. King.
By Albert C. Bree
Attorney.

Patented Aug. 15, 1933

1,922,163

UNITED STATES PATENT OFFICE 1,922,163

ELECTRIC PROTECTIVE SYSTEM FOR ELEVATORS AND THE LIKE

Lloyd E. King, Berwyn, Ill.

Original application July 23, 1923, Serial No. 653,200. Divided and this application January 9, 1931. Serial No. 507,587

9 Claims. (Cl. 172—152)

My invention relates to a system of protection for use in connection with electrically operated elevators, and other electrically driven apparatus, where from time to time it is desirable or necessary to prevent rotation of an electric motor by braking mechanism controlled by the voltage or current of the motor, so that for operating conditions of the motor, the braking mechanism is released and for conditions where the voltage or current of the motor is abnormal, whether too large, too small, or zero, the braking mechanism will be effective to prevent rotation of the motor, regardless of whether mechanical driving effort may be imparted to the motor at the time or not, in order to insure effective and safe operation of the system.

This form of protection is particularly important in connection with elevator systems which are electrically operated, where the voltage impressed on the elevator motor in driving the same, is effective in holding the brake of the motor in released condition, since the voltage generated by the motor itself, with the motor cut off from the line, for example, when the elevator is descending, may readily be sufficient to operate the brake releasing mechanism and produce damage, particularly where the motor is driven at high speeds by the descending elevator. In some instances of this kind, where protecting devices, for example circuit breakers of well known construction, have been used in the past, and as a result of abnormal electrical conditions in the supply circuit, the circuit breakers have been opened, serious accidents have resulted from the descending elevators driving the motors, and producing sufficient voltage to hold the braking mechanism in released condition, notwithstanding the fact that the supply conductors were disconnected from the motors at the time by the opening of the circuit breakers. By my present invention, I employ protective devices initially responsive to abnormal electrical conditions in the supply conductors, which by their operation control secondary devices effective in turn to control the braking mechanism itself, for example, in a system where the braking mechanism comprises in part a spring or springs for setting the brakes, and an electromagnet or an electric solenoid circuit, to open the same and maintain the circuit in open condition as a result of an abnormal electrical condition in the supply conductors, whether the abnormal electrical condition is maintained or not. In this manner, rotation of the motor is stopped and prevented by the occurrence of an abnormal electrical condition in the supply conductors, regardless of whether mechanical driving force is at the time applied to the motor tending to rotate it, or not, with the result that the motor cannot be operated again until the protective devices are reset manually, which, of course, will not be done until it is certain that the motor can again be safely operated. In this manner, accidents of the kind referred to may be prevented.

The protective devices below described as embodying my invention, are illustrative of such devices as may be responsive generically to abnormal electrical conditions, whatever they may be, in the supply conductors of the system; more specifically, the abnormal electrical conditions may consist of electrical conditions above or below predetermined limits, that is above or below limiting values for which it is safe to leave the braking mechanism of the system in condition to be released electrically, for example, the primary protective devices may be responsive to current flow or voltage which is either higher or lower than the amount of current flow through the system or the voltage on the system for which it may safely be operated; still more specifically, the primary protective devices may be responsive to over-load current, that is too high a current value in the supply conductors for safe operation of the system.

The present application is a divisional application of my co-pending application, Serial No. 653,200, filed July 23, 1923, which application has become Patent No. 1,792,310.

Figure 2:
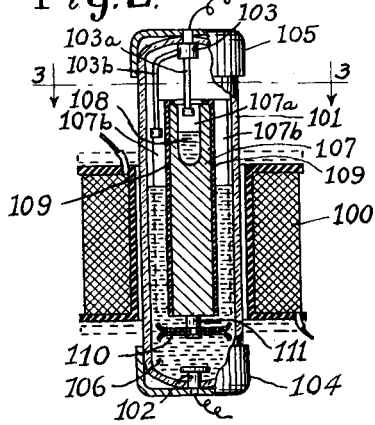
Figure 3:
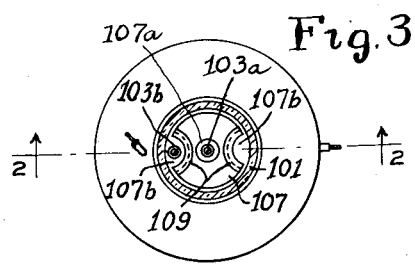

My invention will best be understood by reference to the accompanying drawings showing a preferred embodiment thereof in which Fig. 1 is a diagrammatic view of my protective system, Fig. 2 is a vertical, sectional view of improved control mechanism responsive to abnormal electrical conditions in the supply conductors, this view being taken along the line 2—2 in Fig. 3.

Fig. 3 is a sectional view of the parts shown in Fig. 2 taken along the line 3—3, Fig. 4 shows in vertical, longitudinal, sectional view my improved circuit breaking mechanism, this view being taken along the line 4—4 in Fig. 5, Fig. 5 is a plan view of my improved circuit breaking mechanism, and Fig. 6 is a side elevation of my circuit breaking mechanism in its released condition.

Similar numerals refer to similar parts throughout the several views.

In Fig. 1 I show diagrammatically an electrical system for operating elevators of the type having a brake mechanism provided with releasing coils which are effective to release or free the parts driven by the motor when current is flowing through the releasing coils, and having devices for setting the brake when the current flowing through said releasing coils is interrupted for any reason. It has been found in practice with systems of this kind, that dangerous conditions may develop if the fuses or switches in the supply circuit open the circuit and the operator becomes confused and does not operate the controlling mechanism properly; for example, if the supply circuit should happen to be opened in any manner with the elevator at the top of the shaft and beginning its downward motion, the operator would not know of the interruption until the descent of the elevator became unduly rapid, since at this time the motor would be driven as a generator and the generated current would maintain the brake in released condition. In his excitement, not being aware of the failure of the supply current, the operator might readily fail to bring the controlling apparatus to its zero or neutral position, as he ought to do to interrupt the flow of current from the motor, now a generator, through the brake coils and for any other position of the controlling apparatus, the brake is maintained in released condition by the generated current through the releasing coils, thus giving rise to the possibility of accidents. By my invention as shown in this figure, I connect the actuating coil of a device constructed to protect against high and low voltage, across the supply wires to the motor circuit and at points such that no interruption can occur between the motor and the points of connection of the actuating coil to the wires extending from the motor. I also connect in circuit with the brake the releasing coils, a circuit breaker construction, having its tripping coil in circuit with the control contacts of the high-low voltage protective device. With the protective device thus connected, when the elevator motor is driven as a generator and the voltage becomes abnormally high, the high voltage protective device closes the circuit of the tripping coil of the circuit breaker, the opening of which opens the brake circuit to prevent further rotation of the motor and thus stops the elevator, regardless of the position of the elevator controller. Similarly, in the event current is cut off from the motor supply circuit while the elevator is at rest, or moving upwardly in the shaft, and current of too low voltage is subsequently applied to the supply circuit inadvertently, the danger of releasing the brake circuit in the event the controller is accidentally off neutral position, is avoided by the low voltage control of the protective device; similarly, the possibility of accident is avoided, if the elevator is moving upwardly when the supply current is cut off, by the closing of the low voltage contacts of the protective device as soon as the elevator slows down sufficiently to decrease the voltage generated by the motor driven by the momentum of the elevator and its counterweight, to the voltage for which the low voltage contacts of the protective device are adjusted to operate.

It will be understood that the same protection as just described will result from connecting the main terminals of the circuit breaker 10g at any point in the circuit supplying the windings 231 with releasing current.

As shown in Fig. 1, current is supplied from a generator G1 to line conductors 218, 219 through a circuit breaker 220, and by wires 221, 222 to and through a main switch 223, fuses 224 and circuit breaker mechanism 225 to supply conductors 226 and 227 permanently connected with the controller and motor circuits. The elevator motor is indicated at M1 and is connected with the supply conductors 226 and 227 through the circuits of a controller mechanism 228 in a manner well known in the art and requiring no specific description, the controller mechanism being of a type such that the operating handle is in neutral position when in its mid-position and that the motor M1 is driven in one direction for motion of the handle in one direction from its neutral position and in the other direction for motion of the operating handle in the other direction from its neutral position. The motor M1 is mechanically connected with a brake drum 229 engaged by a spring actuated brake 230 normally held from engagement with the drum during operation of the motor, by windings 231 connected by wires 232, 232' and 233 with the supply wires 226 and 227, the connection of the wire 232 to the wire 226 being through the main contacts of the circuit breaker 10g, wires 234 and 235, and the connection with the wire 227 being through wire 232', the contacts and switch arm of the controller 228, and wire 233. The actuating winding 100 of the protective device has its terminals connected with wires 235 and 236 respectively, the wire 236 being in turn connected with the wire 233. The control contacts of the protective device are connected respectively with the wires 236 and 237, the wire 237 being connected in turn with one terminal of the tripping coil 217g and the other terminal of which is connected with the auxiliary breaker mechanism 36g, the other terminal of which is connected with wire 234.

As a result of the construction and connections described, when a voltage is maintained between the wires 226 and 227 in any manner, which is approximately that for which the system is designed, the brake 230 is released for any position of the controller handle, excepting its neutral or mid-position, and as pointed out, this may occur under certain conditions when the supply circuit is disconnected or discontinuous and the motor M1 is, for the time being, driven by the elevator as a generator. With the protective devices connected as described however, for any condition of either abnormally low or abnormally high voltage, the circuit through the tripping coil 217g is closed, and the voltage then existing between the wires 226 and 227, is effective in energizing the said tripping coil and the circuit breaker 10g is opened, thus interrupting the circuit of the brake windings 231 and setting the brake to prevent further motion of the elevator.

In Figs. 2 and 3 I show a construction of mechanism for protecting desired circuits and apparatus from abnormally high and abnormally low current flow or voltage, depending upon how the actuating coil of the device is wound and connected. In this construction the device is provided with an actuating coil 100 through which a tube 101 of insulating material, for example glass, extends, the coil being preferably movable axially of the tube, as illustrated by dotted lines, to adjust the action of the device. The tube 101 is provided with a lower terminal 102 and an upper terminal 103 of conducting material projecting through the ends of the tube and in electrical connection with protecting caps 104 and 105 carried by the ends of the tube. The upper terminal 103 is branched on its inner end to form two contacts 103a and 103b, the former being axially disposed and the latter extending adjacent the inner side wall of the tube 101. The tube 101 contains liquid conductor, for example mercury, as indicated at 106 and in the liquid conductor a float of magnetic material, for example iron, is disposed as indicated at 107. The float 107 is provided at its upper end with a cup 107a containing liquid conductor, for example mercury as indicated at 108. On its outer surface the float 107 is grooved longitudinally as indicated at 107b, said grooves being lined with insulating material 109 so that the contact 103b may extend into one of said grooves without making electrical contact with the float 107. The float 107 carries at its lower end a perforated disc 110 secured in spaced relation to the end of the float by a central stud 111, said disc preferably having upwardly and downwardly projecting edge flanges as indicated. The parts of the device are so proportioned, and the level of the liquid conductor 106 is so taken, that under normal conditions of current flowing through the actuating winding 100, the contacts 103a and 103b will be out of contact with the liquid conductors 108 and 106 respectively. For this relation of the parts, with normal current flow through the winding 100, the float extends some distance above the upper end of the coil 100 and its lower end is just within the lower end of said coil. If now the current flowing through the coil 100 decreases to a predetermined value lower than the normal value, the magnetic pull on the float 107 is decreased sufficiently to permit it to rise until the contact 103a makes electrical connection with the conductor 108, thus closing the control circuit extending from the terminals 102 and 103. On the other hand if the current flowing through the coil 100 is increased above its normal value until a predetermined high value of current is reached, the magnetic pull on the float 107 is increased thus drawing it downwardly in the liquid conductor 106, for which condition the displaced liquid conductor 106 rises around the float until it makes electrical contact with the contact 103b, thus closing the control circuit extending from the terminals 102 and 103. It will be understood, that by changing the relation of the parts shown in Fig. 2, so the float 107 is normally below the coin 100, an abnormal increase of current flow will raise the float and close the control circuit through the contact 103a, and an abnormal decrease of current flow will permit the float to correspondingly sink and close the control circuit through the contact 103b.

The device just described may be constructed to actuate the control circuit for abnormally high and low current values in the protected circuit by so winding the coil 100 that it may be included in series in said circuit and the same device may be employed to protect a circuit against abnormally low and abnormally high voltage by winding the coil 100 so that it may be connected between the conductors of the circuit to be protected and subjected to the voltage between said conductors.

It will be noted that the disc 110 extends nearly to the inner surface of the tube 101, as a result of which motion of the disc either upwardly or downwardly in the liquid conductor, is retarded and a time element of operation is introduced determined by the amount of clearance between the disc and the tube 101 and the size of the apertures through the disc. In this manner closure of the control circuit is prevented for either a momentary increase or a momentary decrease of current flow from its normal value, although the same amount of change of flow might be sufficient, if maintained, to cause a closure of the control circuit.

As shown in Figs. 4-6 inclusive my circuit breaker construction illustrated diagrammatically at 10g in Fig. 1, consists of a tube 10 of insulating material in which a metal plunger 11 is mounted to move longitudinally. The tube 10 carries at one end an outer metallic sleeve 12 having its outer end inturned to form a main contact or contacts 12a of the device, engaged by the plunger 11 in its set position. The inner end of the contact 12a carries a ring 13 of refractory conducting material, for example carbon, extending beyond the end of the contact, so that the break in the circuit, when the plunger 11 is withdrawn from the contact, is between the end of the plunger and the ring 13. The end of the plunger as indicated at 11a is chamfered somewhat, so that the principal arcing that occurs will be between the extreme end of the plunger and the ring 13, and thus the pitting that would otherwise occur on the main contact surface of the plunger, is restricted to the end portion and does not roughen the contact portion of the plunger.

The sleeve 12 has mounted thereon and insulated therefrom a tripping coil 14 with its outer end nearly in the plane of the end of the tube 10 which is adjacent the arcing plane of the ring 13. The tripping coil 14 may consist of one or more sections, or coils, each capable of releasing the circuit breaker mechanism, as will be described below. The coil 14 is provided with heads 14a of magnetic material, for example soft iron, to act upon the armature 15, also of magnetic material, in a manner to be described. The other end of the tube 10 has mounted therein a metal sleeve 16 in sliding contact with the plunger 11 to constitute the other main contact of the device. The sleeve 16 is provided with an outer end flange which is extended to form a bracket 17 serving as a support for the pivot 18 of the arm 19 carrying the armature 15, serving also by its rearward extension to form a connecting and mounting clip or clips 20, as more clearly shown in Fig. 6, and also serving to in part support, by means of an annular flange 21 carried thereby, an auxiliary breaker to be described. The sleeve 12 carries on its outer end a second metal sleeve 22 closed at its outer end and perforated as indicated at 22a and having a lateral extension or extensions 23 to form a connecting and mounting clip or clips for the device. The clips 20 and 23 by their electrical connection with the contacts 16 and 12a respectively, constitute the main connections of the circuit breaker to the circuit to be protected thereby, and these clips may engage suitable bolts or jaws connected with the conductors forming part of the protected circuit, as a result of which the device as a whole may be readily connected in the circuit and readily removed therefrom as may be necessary or desirable. These clips may have any convenient form and construction, the only desiderata being that they shall make good contact with the terminals of the protected circuit and be capable of ready connection therewith and ready disconnection therefrom.

The plunger 11 has rigidly connected with its lower end, a laterally extending arm 24, preferably of metal, and between the said arm and the outer end of the contact sleeve 16, the plunger carries a metal sleeve 25 provided at its outer end with a flange 25a engaging one end of a spring 26, the other end of which rests against the flanged outer end of the contact sleeve 16. The flanged end 25a is extended on one side of the plunger, to form a support for a pivotal connection 27 engaging one end of a first link 28, which is pivotally connected at its other end, as indicated at 29, with one end of a second link 30, the other end of which is pivotally connected at 31 with a downwardly projecting arm 32 carried by the bracket 17. For the closed position of the circuit breaker shown in Fig. 4, the plunger 11 is in engagement with the contact 12a, the spring 26 is compressed, and the links 28 and 30 occupy a position preventing the spring from moving the plunger out of the contact 12a, since the line of pull through the pivotal connections 27 and 29 is slightly to the right, for the position of the parts shown in Fig. 4, of the pivotal connection 31. The links 28 and 30 are prevented from moving around to the right, for the position of the parts shown in Fig. 4, by a suitable stop, which, as shown, may conveniently consist of an ear 32a bent from the edge portion of the arm 32. The arm 19 is extended beyond its pivotal support 18, and the said extension carries an arm 33 having a bent end or hook 33a, nearly or quite in engagement with the upper end portions of the links 28 and 30 for the position of the parts shown in Fig. 4. The arm 19 and the armature 15 are held in the position indicated in Fig. 4, by a spring 34 between the lower extension of the arm 19 and the arm 32, and outward motion of the armature 15 away from the tripping coil, is limited by a stop 35 carried by the lower end of the extension of the arm 19, which rests against the edge of the arm 32.

As a result of the construction thus far described, when the armature 15 is drawn towards the magnetic heads 14a of the tripping coil, by energization of the coil, the bent end 33a of the arm 33, moves the upper ends of the links 28 and 30 to the left sufficiently to move the line of pull on the link 28, through the pivotal connections 27 and 29, to the left of the pivotal connection 31, thus releasing the locking condition of the links and permitting expansion of the spring 26 to move the sleeve 25, and therefore the plunger 11, downwardly to the position indicated in Fig. 6. This movement, it will be understood, takes place very quickly and produces a quick break in the circuit between the lower inner edge of the ring 13 and the extreme upper edge of the chamfered portion 11a of the plunger 11, thus reducing arcing to a minimum. Any arcing that occurs at this time is further reduced, or entirely suppressed, by the magnetic action of the tripping coil 14, which is effective as a magnetic blow-out, due to its relation to the breaking or arcing point of the mechanism. The circuit through the tripping coil is maintained during the separation of the end of the plunger from the ring 13, to secure the magnetic blow-out effect referred to, and the circuit of the tripping coil is subsequently broken by means of the following construction.

The auxiliary breaker mechanism illustrated diagrammatically at 36g in Fig. 1, consists of a second tube of insulating material 36 supported at its lower end, for the position of the parts shown in Fig. 4, by the annular flange 21 and at its upper end by a clip 37 secured to the lower head 14a of the tripping coil. The tube 36 contains therein a freely movable metal rod 38 engaging a tubular contact 39 at its upper end when the rod 38 is in the position shown in Fig. 4. The contact 39 is of the same general construction as the contact 12 and is rigidly supported by the upper end of the tube 36. The upper end of the tube 36 is also provided with a cap 40, preferably of insulating material, to protect the parts. The end wall of the cap 40 is preferably perforated and a perforated disc 41 is shown between the cap and the outer end of the contact 39, to prevent the projection outwardly from the auxiliary breaker, of any flames or burning gases that may be produced by it. The sleeve 22 also holds between its end and the end of the contact 12a, a similar perforated disc 42 for securing the same result with the main breaker. The upper end of the rod 38 is preferably chamfered for the same reason described above for the chamfered portion 11a of the plunger 11. The tube 36 carries a second contact 43 at its lower end, which is in sliding engagement with the rod 38. Provision is made on the contact 43 for connecting the same by a wire 44 with a tripping circuit, and the lower end of the contact 43 and the said connection are preferably enclosed by a protecting cap 45 of insulating material. The upper contact 39 of the auxiliary breaker is connected by a wire 46 with one terminal of the tripping coil 14, and the other terminal of the tripping coil is connected with a wire 47 to form the other connection with the tripping circuit.

The rod 38 has rigidly secured to its lower end a rod 48 of insulating material provided near its upper end with an arm 49 engaging one end of a spring 50 the other end of which is connected with a rod 51 having a bent lower end 51a, said rod 51 extending loosely through an aperture provided therefor in the arm 24. The rod 48 is rigidly secured at its lower end to a metal rod 52 provided at its upper end with a flange 53 and at its lower end with a flange 54, said rod 52 extending with a sliding fit through a suitable aperture therefor in the outer end of the arm 24.

As a result of the construction described, operation of the auxiliary breaker is effected as follows: when the spring 26 moves the plunger 11 from the upper contact 12a, the arm 24 moves freely on the rods 51 and 52 and at this time the spring 50 is under no tension. After the upper end of the plunger 11 has left the ring 13, or at about the time it leaves the ring, the bent end 51a of the rod 51 is engaged by the arm 24 and further movement outwardly of the arm 24 places the spring 50 under tension which condition continues until the arm 24 engages the flange 54. The engagement of the arm 24 with the flange 54, as a result of the arm 24 being in rapid motion at the time, produces a hammer blow effect on the rod 52 and therefore on the rod 38, to start the rod 38 in motion downwardly against the friction of the contacts engaging it, and when the rod 38 leaves the contact 39, the spring 50 operates to move the rod 38 rapidly from the end of the contact 39, thus quickly breaking the circuit of the tripping coil, the current flowing in which may be made relatively small in any event by properly proportioning the windings. The flange 53 prevents the rod 38 from being drawn too far from the tube 36 and also serves to move the rod 38 back to the position shown in Fig. 4 when the arm 24 is raised to close the main contacts of the circuit breaker, thus insuring the closure of the contacts of the auxiliary breaker, every time that the contacts of the main breaker are closed.

It will be noted that for the closed condition of the contacts of the circuit breaker, the flanged end 25a of the sleeve 25 is somewhat above the upper surface of the arm 24, the amount of this separation being determined by a headed stud or studs 55 extending through a clearance opening or openings therefor in the arm 24 and secured to the flanged head 25a of the sleeve 25. The stud or studs 55 thus serve to prevent undue separation between the arm 24 and sleeve 25 and the separation referred to provides that the sleeve 25 shall impart a hammer blow to the arm 24 when the main circuit breaker is released and thus effect a positive beginning of the movement of the plunger 11 in the contact 12a against its frictional engagement with said plunger.

After the tripping coil has been actuated and the parts have moved to the position indicated in Fig. 6, opening both the main circuit and the tripping coil circuit, the circuit breaker may readily be reset, or moved to the position shown in Fig. 4, by raising the arm 24 and moving the pivotal connection 29 outwardly and around to the right relatively to the pivot connection 31, until the ends of the links 28 and 30 adjacent the pivotal connection 29, rest against the stop 32a in close proximity to the bent end 33a of the arm 33.

The arm 32 is shown as extended downwardly to form a bracket 32b supporting insulated contacts 32c and 32d, for actuation by the arm 25a for the open position of the circuit breaker. These contacts are provided to permit controlling additional circuits by the opening of the circuit breaker, for example where it is desired to use a plurality of the circuit breakers in a definite sequence of operation to protect an electrical system, each of the circuit breakers may be provided with a tripping coil circuit controlled by the contacts 32c and 32d of another of said breakers, so that the opening of any one of said circuit breakers will cause the opening of the next one in the sequence and so on.

While I have shown my invention in the particular embodiment above described, it will be understood that I do not limit myself to this exact construction as I may employ equivalents known to the art at the time of the filing of this application without departing from the scope of the appended claims.

What I claim is:

1. In a system of the class described, the combination of a supply circuit, a motor connected with said circuit, a brake for said motor, electrical windings for releasing said brake by their energization, a brake circuit extending from said windings, circuit opening devices in said brake circuit, a tripping coil for said circuit opening devices, and a control circuit extending from said tripping coil to said supply circuit and operative for abnormal electrical conditions in said supply circuit, whereby for said abnormal electrical conditions said brake is freed from the action of said releasing windings and prevents rotation of said motor.

2. In a system of the class described, the combination of a supply circuit, a motor connected with said circuit, a brake for said motor, electrical windings for releasing said brake by their energization, a brake circuit extending from said windings, circuit opening devices in said brake circuit, a tripping coil for said circuit opening devices, and a control circuit extending from said tripping coil to said supply circuit and operative for current flow in said supply circuit above a predetermined value, whereby for said current flow said brake is freed from the action of said releasing windings and prevents rotation of said motor.

3. In a system of the class described, the combination of a supply circuit, a motor connected with said circuit, a brake for said motor, electrical windings for releasing said brake by their energization, a brake circuit extendng from said windings, circuit opening devices in said brake circuit, a tripping coil for said circuit opening devices, and a control circuit extending from said tripping coil to said supply circuit and operative for electrical conditions in said supply circuit above and below predetermined values, whereby for said electrical conditions said brake is freed from the action of said releasing windings and prevents rotation of said motor.

4. In a system of the class described, the combination of a supply circuit, a motor connected with said circuit, a brake for said motor, electrical windings for releasing said brake by their energization, a brake circuit extending from said windings, circuit opening devices in said brake circuit, a tripping coil for said circuit opening devices, and a control circuit extending from said tripping coil to said supply circuit and operative for abnormal voltage on said supply circuit, whereby for said voltage said brake is freed from the action of said releasing windings and prevents rotation of said motor.

5. In a system of the class described, the combination of a supply circuit, a motor connected with said circuit, a brake for said motor, electrical windings for releasing said brake by their energization, a brake circuit extending from said windings, circuit opening devices in said brake circuit, a tripping coil for said circuit opening devices, and a control circuit extending from said tripping coil to said supply circuit and operative for voltage on said supply circuit below a predetermined value, whereby for said voltage said brake is freed from the action of said releasing windings and prevents rotation of said motor.

6. In a system of the class described, the combination of a supply circuit, a motor connected with said circuit, a brake for said motor, electrical windings for releasing said brake by their energization, a brake circuit extending from said windings, circuit opening devices in said brake circuit, a tripping coil for said circuit opening devices, and a control circuit extending from said tripping coil to said supply circuit and operative for voltages on said supply circuit above and below predetermined values, whereby for said voltages said brake is freed from the action of said releasing windings and prevents rotation of said motor.

7. In a system of the class described, the combination of an electric elevator motor, a member driven by said motor, a motor operating circuit comprising a plurality of conductors for supplying operating current to said motor, mechanical devices controlling operation of said driven member by said motor during usual operation of said motor, and protective devices responsive to abnormal electrical conditions in said supply conductors and by their operation exercising dominating control of said mechanical devices and said driven member.

8. In a system of the class described, the combination of an electric elevator motor, a member driven by said motor, a motor operating circuit comprising a plurality of conductors for supplying operating current to said motor, mechanical devices controlling operation of said driven member by said motor during usual operation of said motor, and protective devices responsive to electrical conditions above and below predetermined limits in said supply conductors and by their operation exercising dominating control of said mechanical devices and said driven member.

9. In a system of the class described, the combination of an electric elevator motor, a member driven by said motor, a motor operating circuit comprising a plurality of conductors for supplying operating current to said motor, mechanical devices controlling operation of said driven member by said motor during usual operation of said motor, and protective devices responsive to current flow above and below predetermined limits in said supply conductors and by their operation exercising dominating control of said mechanical devices and said driven member.

LLOYD E. KING.